(12) United States Patent  (10) Patent No.: US 8,065,054 B2
Tarasinski et al.  (45) Date of Patent: Nov. 22, 2011

(54) VEHICLE ACTIVE SUSPENSION SYSTEM

(75) Inventors: Nicolai Tarasinski, Frankenthal (DE);
Klaus Hahn, Mannheim (DE)

(73) Assignee: Deere & Company, Moline, IL (US)

( * ) Notice: Subject to any disclaimer, the term of this patent is extended or adjusted under 35 U.S.C. 154(b) by 904 days.

(21) Appl. No.: 12/060,417

(22) Filed: Apr. 1, 2008

(65) Prior Publication Data

US 2008/0275606 A1 Nov. 6, 2008

(30) Foreign Application Priority Data

May 4, 2007 (DE) .......................... 10 2007 021 498

(51) Int. Cl.
*B60G 17/016* (2006.01)

(52) U.S. Cl. .......... 701/37; 701/50; 280/5.5; 340/407.1; 340/438

(58) Field of Classification Search .................... 701/50, 701/37, 1; 180/902, 89.12, 89.13; 280/5.5; 340/407.1, 438
See application file for complete search history.

(56) References Cited

U.S. PATENT DOCUMENTS

| 6,898,501 B2 * | 5/2005 | Schubert ................. 701/50 |
| 2004/0049323 A1 | 3/2004 | Tijerina et al. |
| 2008/0243344 A1 * | 10/2008 | Casey et al. .................. 701/50 |

FOREIGN PATENT DOCUMENTS

| DE | 10348916 | 6/2005 |
| DE | 102005009701 | 9/2006 |
| EP | 0913280 | 5/1999 |
| EP | 1186467 | 3/2002 |
| EP | 1582382 | 10/2005 |
| FR | 2828154 | 2/2003 |
| WO | 2005042300 | 6/2005 |
| WO | 2007030036 | 3/2007 |

OTHER PUBLICATIONS

European Search Report received Nov. 5, 2010 (9 pages).

* cited by examiner

*Primary Examiner* — Faye M Fleming
*Assistant Examiner* — Keith Frisby

(57) ABSTRACT

The invention relates to a vehicle active suspension system. There is a need for an active suspension system which can alert an operator to certain conditions. The suspension system includes an actuator for moving a second vehicle part relative to a first vehicle part. The suspension system also includes sensors and a control unit. A vehicle operator is located in or on the second part. The sensors sense vehicle parameters and transmit parameter signals to the control unit. In response to the parameter sensors, the control unit causes the actuator to move the second part in such a manner that the movement alerts the operator to the existence of a condition, such as a critical or non-optimal operating state of the utility vehicle or of an implement coupled to the vehicle.

14 Claims, 5 Drawing Sheets

VEHICLE ACTIVE SUSPENSION SYSTEM

FIELD OF THE INVENTION

The present invention relates to an active suspension system for an agricultural or industrial utility vehicle.

BACKGROUND OF THE INVENTION

Active suspension systems are used on utility vehicles, such as tractors, harvesting machines, combine harvesters, forage harvesters, self-propelled sprayers, as well as industrial utility vehicles, such as construction vehicles, bulldozers, graders, backhoe excavators, loader vehicles, tipper trucks, cranes and telescopic loaders. Active suspension systems are suspension and damping systems, by means of which movements between a first part and a second part of the vehicle are cushioned and/or dampened. Such systems are known from the prior art, in particular with a seat suspension system of the applicant, which is disclosed in EP 1 186 467 B1. Such active suspension systems are also used in chassis of vehicles—generally large executive cars. A known axle suspension system is described in EP 0 913 280 A1. Such systems exclusively serve to cushion the driver relative to vibrations of the vehicle and/or of the first part and/or to counteract said movements. As a result, comfort is increased during the operation of the vehicle. Such cushioning, however, may lead to a false evaluation of critical driving conditions, as identifiable, tactile feedback between the vehicle and the operator due to the active suspension system no longer being present or the effect of said active suspension system being considerably reduced.

During the operation of a utility vehicle, assistance is provided to the operator visually, or optionally acoustically, by warning display elements. In this connection, warning lights are primarily provided which indicate a critical state of the utility vehicle, for example that of the excessive temperature of the engine oil or the coolant above an upper threshold value. The detection by an operator of such warning signs may be interfered with by external influences, such as light, noise and/or field of vision.

SUMMARY OF THE INVENTION

Accordingly, an object of this invention is to provide an active suspension system which can be used to alert an operator about the existence of a critical or non-optimal operating state of the vehicle.

This and other objects are achieved by the present invention, wherein a method is provided for operating an active suspension system of a utility vehicle. The active suspension system includes an actuator for moving a second vehicle part relative to a first vehicle part. The actuator is controlled by a control unit in response to an currently present operating state of the utility vehicle. The control unit actively controls the actuator to make noticeable to the operator a non-optimal or an unsafe operating state of the vehicle.

The operation of a utility vehicle may be simplified and optimized if an unsafe or non-optimal operating state is displayed to the operator not only by visual display instruments. Conventional utility vehicles include a tachometer for displaying engine speed. If the engine is continuously operated above the normal maximum operating speed, a conventional utility vehicle will have no further indicators, apart from increased noise generated by the engine. This noise may not be detected if the cab of the utility vehicle is well soundproofed. This may lead to engine damage and thus to inconvenience and high costs. According to the invention, the operator is optionally made aware of such an operating state of the utility vehicle by a tactile manner, via an acoustic and/or visual warning device. This is advantageous when the operator has to react immediately such as to prevent overload or an accident. The invention may be used to help make an operator aware of conditions which may not be immediately noticed. Above all, this could be relevant for trailers (for example a sprayer with an extended spraying boom) attached to the utility vehicle, which for example carry out rolling and/or yaw movements due to the unevenness of the ground and thus may bring the utility vehicle and the trailer into a dangerous overall state.

The invention may be applied to different suspension systems of a utility vehicle. For example, the active suspension system could be applied to a seat suspension. The active suspension system could be applied to a wheel and/or axle suspension, wherein the first part is an independent wheel suspension or a vehicle axle and the second part is a vehicle frame or a vehicle chassis. The invention could also be applied to a suspension for an operator platform and/or utility vehicle cab, wherein the first part is a vehicle frame and the second part is an operator platform or a utility vehicle cab.

Thus the actuator may carry out a passive (sprung) movement, when the first part is moved relative to the second, part. In this case, the actuator might be additionally controlled such that the actuator carries out a predetermined (preferably periodic) movement which may be temporally altered. It is, however, also conceivable that the actuator does not passively take part in a basic movement between the first part and the second part and is merely used for the active movement excitation according to the invention. The type of movement produced by the actuator may, in principle, be of any type, periodic or aperiodic. The amplitudes of the movement may be substantially constant or variable. A single movement or repeated movements are conceivable. A movement corresponding to a vibrating alarm of a mobile telephone, for example of the vehicle seat, could also be provided.

The actuator may cause the second part to vibrate relative to the first part at a predetermined frequency, which is preferably substantially constant and/or is in the range of 0.1 Hz to 1000 Hz. Alternatively, the actuator may cause the second part to pulsate relative to the first part with a predetermined pulse interval and/or a predetermined pulse duration which is preferably constant and/or is in a range of 1 to $\frac{1}{1000}$ seconds. The pulsed movement could have a substantially triangular pulse shape or a saw tooth shape. A predetermined pulse interval could be in a range of 0 to 10 seconds.

Preferably, the movement produced by the actuator has a predetermined frequency which is not in a natural frequency range of the vehicle or of the operator. Accordingly, the active movement should not lead to a build-up of the suspension system and thus to a dangerous situation of the utility vehicle and/or the components thereof. For active movements of longer duration, the active movement frequency should not be near the natural frequency range of the operator, for example a frequency of the range of 2 Hz to 7 Hz, which is the natural frequency of the human stomach, so that the operator does not feel unwell.

The movement caused by the actuator preferably has a constant amplitude in a range of 1 mm to 20 cm. Greater amplitude values, for example in a range of 10 cm to 20 cm, are mainly conceivable with an axle suspension system. Smaller amplitude values, for example 1 mm to 3 cm could, in contrast, be provided with a seat suspension.

The system includes an actuator sensor to sense the current state of the actuator. The currently state of the actuator may be transmitted by an electrical signal to the control unit. As a result, the current operating state of the actuator may be communicated to the control unit for use in the active control of the actuator. For example, a sensor could be provided which detects the current position of a piston of a dual-acting hydraulic cylinder. The actuator could be electrical, pneumatic or hydraulic and/or hydropneumatic.

Preferably, the actuator is hydraulic cylinder, such a dual-acting hydraulic cylinder. The actuator may be actively controlled by a valve which controls the flow of pressurized hydraulic fluid.

A sensor detects a variable or parameter which represents a state of the utility vehicle, such as speed, acceleration, direction of travel, the steering angle, the deviation from a predetermined direction of travel, the spatial position of the utility vehicle, the yaw movement or the yaw moment, the presence of an obstruction, the speed of a motor shaft or gear shaft, the speed of a wheel, the torque transmitted by a shaft, the torque output by a hydraulic power unit, the performance or the capacity utilization of a hydraulic power unit, the energy consumption or the fuel consumption of a consumer, the slippage of the utility vehicle over the ground, an axle load, the pressure or the volumetric flow or the alteration to the volumetric flow of a hydraulic fluid, the travel of a cylinder, the driving state, the motive force of the utility vehicle and/or the force of a trailer and/or an implement acting on the utility vehicle. The parameter may be a tractive force, a transverse force and/or a supporting force acting on the vehicle. The control unit controls the actuator as a function of the sensed parameter.

Preferably, the actuator has a predetermined characteristic, such as a spring rate depending on a spring path and/or an axle load. The characteristic has, depending on the state variable to be controlled, at least partially—preferably over the entire range—a constant analytical function, as is shown for example in FIG. 3 of EP 0 913 280 B1 in an axle suspension system.

Utility vehicles normally have a suspension system which isolates one part of the vehicle from forces applied to another part of the vehicle. An example is a cab suspension system which cushions the cab from movements of the vehicle frame. As a result, the vehicle operator may falsely evaluate or underestimate critical driving conditions. Therefore, such a suspension system could be provided with an actuator for moving the second part relative to the first part, in order to simulate a generated force or torque. Preferably, such a force or torque is simulated by part of the actually occurring movement amplitude. Thus, from a predetermined vehicle speed and with highly uneven ground, an actuator in a cab suspension system could be controlled so that the impact of the second part relative to the first part due to the movement on the uneven ground is nevertheless indicated—albeit with a time delay—to the operator of the utility vehicle. A comparable function might, in principle, also be conceivable with the blocking of a passive cab suspension system, all impacts being nevertheless transmitted in an uncushioned manner.

Preferably, the actuator moves the second part relative to the first part when an operating state deviating from an optimal or safe operating state is present, or when operating state or an operating function exceeds or falls below a predetermined threshold value. The actuator may be actively controlled to alert the operator, such as when the speed of a shaft and/or a shaft of an implement deviates from a predetermined speed or from a predetermined speed range, when the speed of the utility vehicle deviates from a predetermined speed or from a predetermined speed range, or depending on the nature of the road surface and/or the ground. For example, if the ground is highly uneven, as detected by a corresponding sensor, when exceeding a predetermined driving speed of the utility vehicle, the actuator could be activated.

The actuator could be moved in a pulse in response to a specific state of an implement coupled to the vehicle.

The control unit could be programmed to interrupt actuator movement in certain situations, such as automatically during extreme cornering. A switch could be provided by which an operator could turn this function off.

Moreover, a visual and/or acoustic signal may be generated in addition to the movement by actuator, with an intensity which increases with increasing danger. Additionally or alternatively, an acoustic signal in the form of a warning tone (possibly with increasing loudness) could be produced. Thus, an operator might be warned of a safety risk in a tactile, visual and acoustic manner via a loudspeaker in the cab.

The utility vehicle with this suspension system could be a self-propelled working machine and/or a tractive machine of the agricultural, construction or forestry field. The utility vehicle may be a tractor, a harvesting machine, a combine harvester, a forage harvester, a construction machine and/or a forestry tractor.

DESCRIPTION OF THE PREFERRED EMBODIMENT

Figure 1:
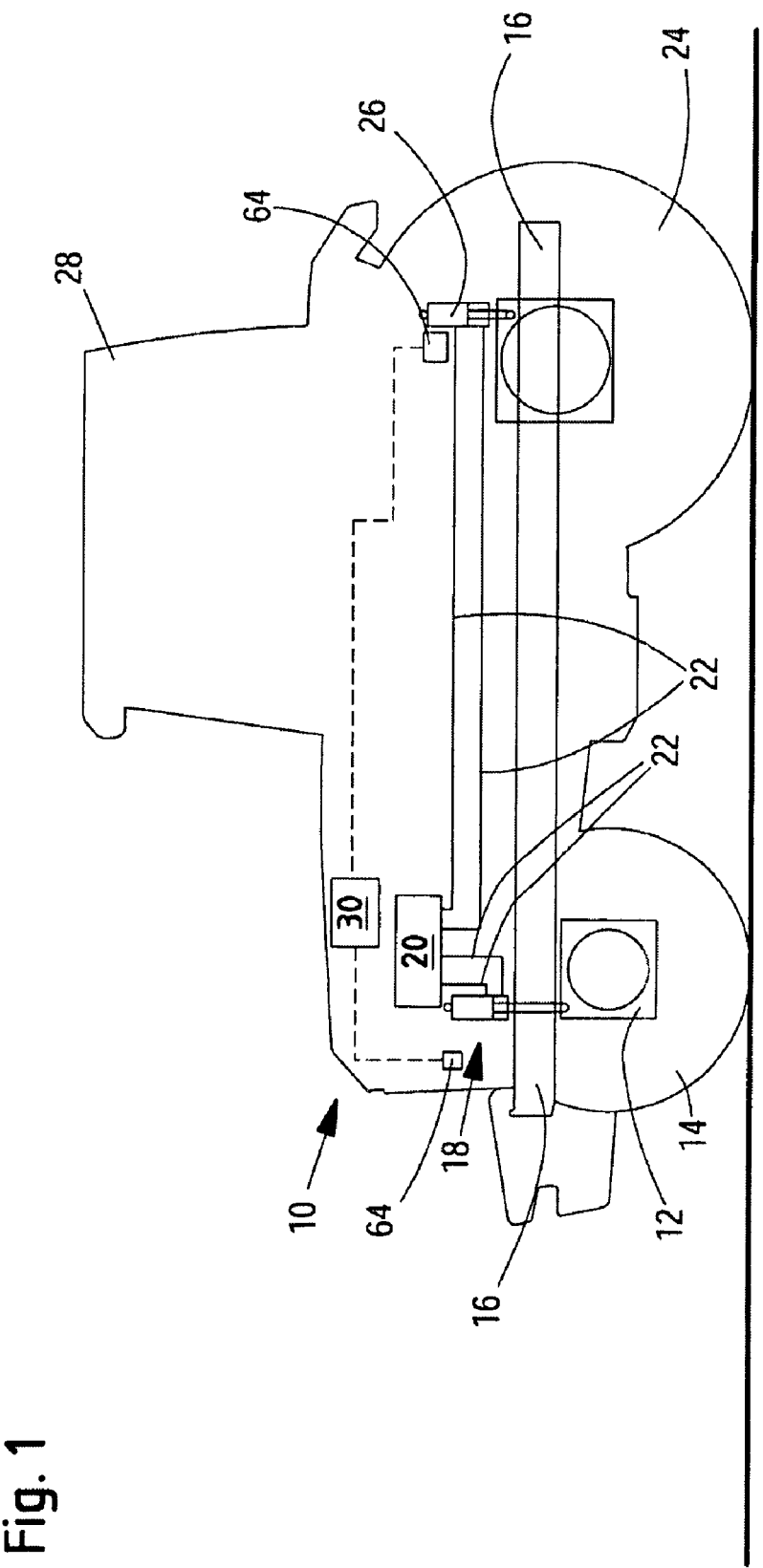
FIGS. 1-3 are schematic diagrams showing embodiments of an active suspension system implemented on an agricultural utility vehicle.
Figure 2:
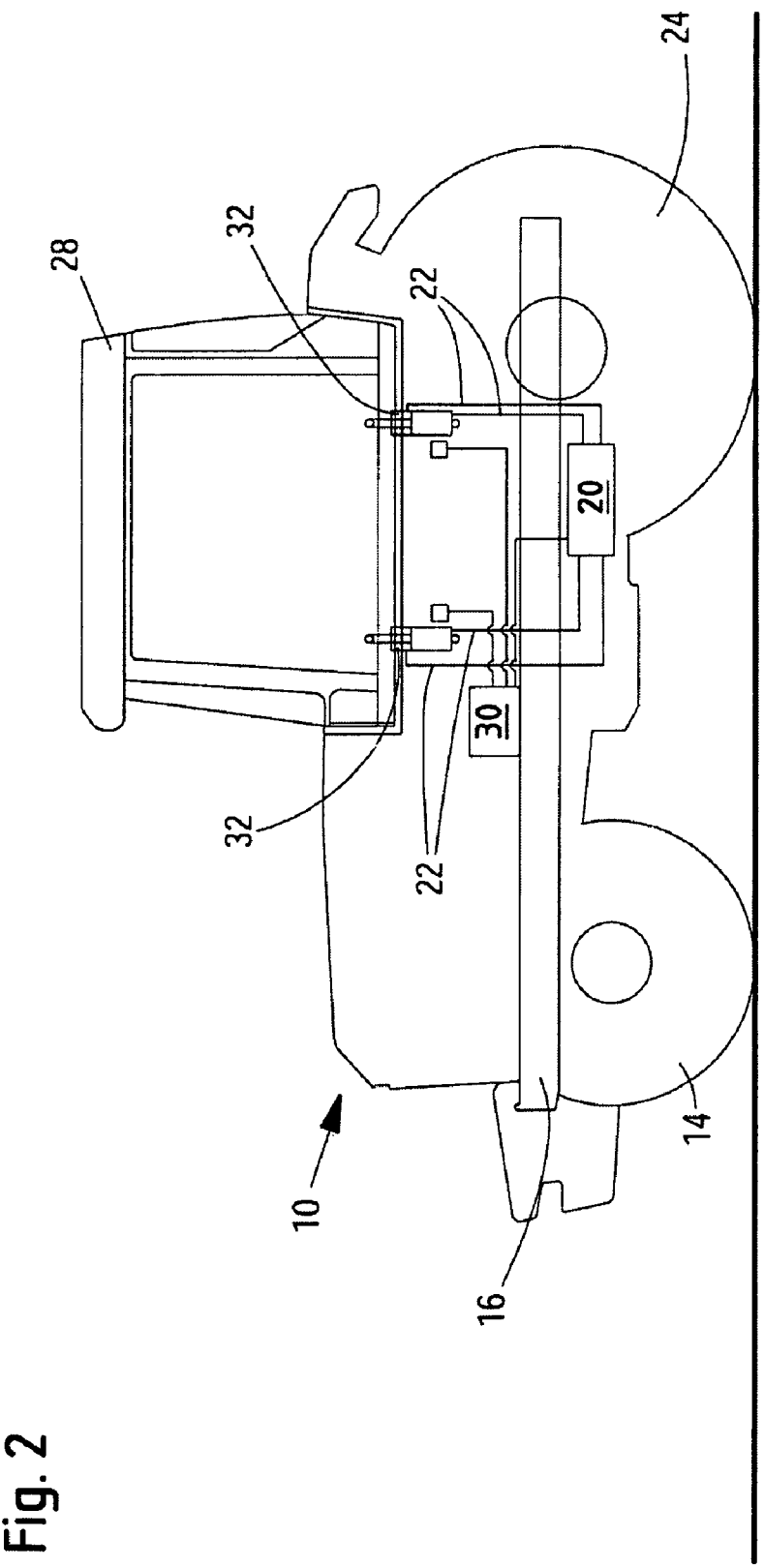
Figure 3:
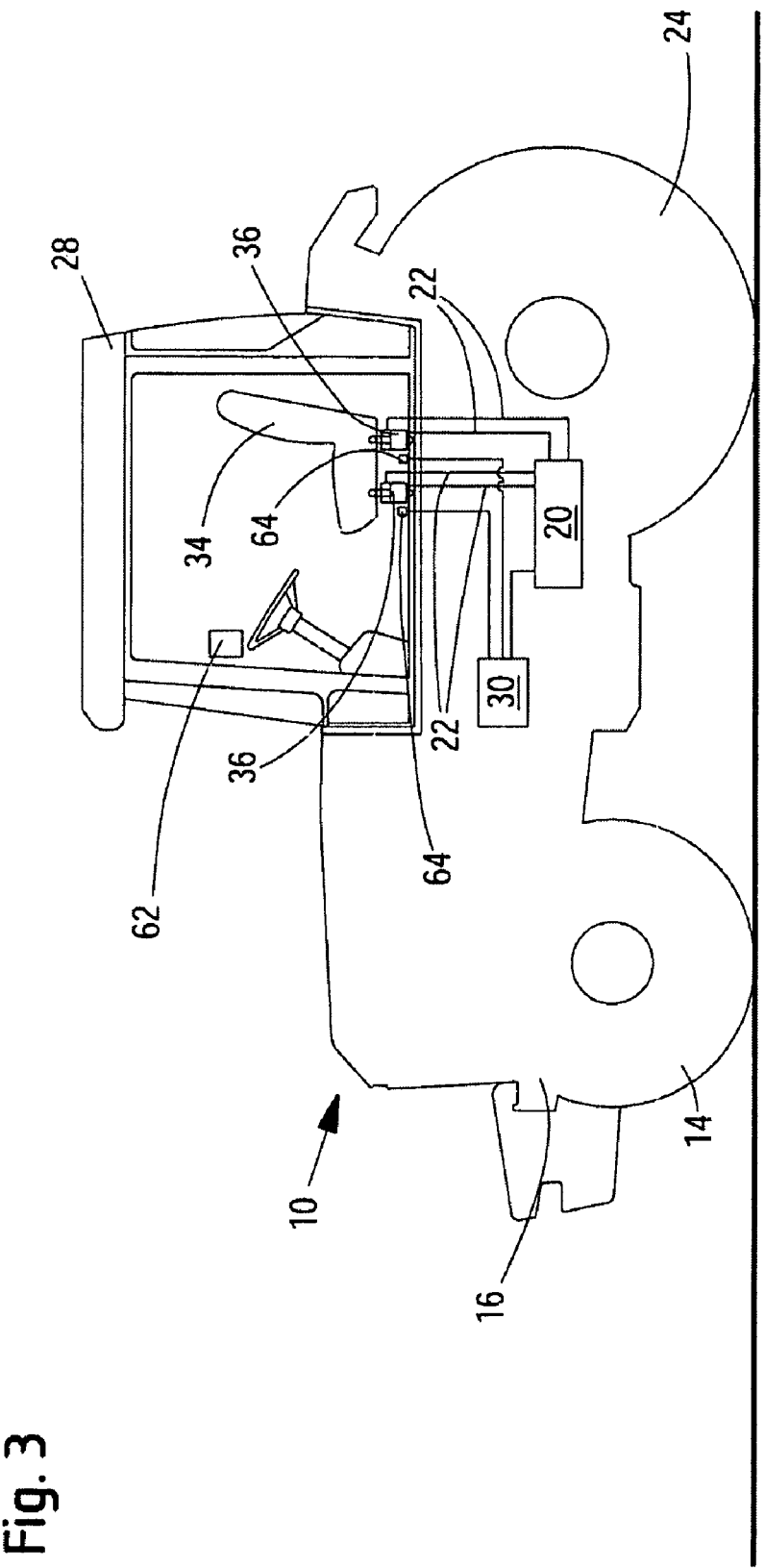

FIGS. 1 to 3 show embodiments of an active suspension system implemented on a tractor 10. In FIG. 1 an axle and/or wheel suspension suspension system is shown. In FIG. 2 the vehicle has an active cab suspension system. In FIG. 3 the seat of the agricultural vehicle is equipped with an active suspension system.

The active suspension system of FIG. 1 has an active front axle suspension as well as an active suspension of the rear wheels, which are movably mounted according to the principle of an independent wheel suspension. A front wheel 14 is rotatably mounted at each end of the front axle 12. The front axle 12, as the first part, is supported in a resilient and dampened manner relative to the frame 16, as the second part, by left and right side actuators 18. The actuators 18 are dual-acting hydraulic cylinders. The active suspension system is a hydro-pneumatic axle suspension system, as is known from EP 0 913 280 B1, for example. The hydraulic system 20 is merely schematically indicated, and includes a hydraulic pump, a sump, an accumulator, valves and hydraulic lines (not shown). The actuators 18 are connected to the hydraulic system 20 by means of connecting lines 22 for hydraulic fluid and for control and sensor signals.

The rear wheels 24 are suspended in a resilient and dampened manner by means of an independent wheel suspension (not shown) on the frame 16 of the utility vehicle 10. The components of the independent wheel suspension for wheels 24 (not shown) form the first part and the frame 16 forms the second part. The independent wheel suspension could, in principle, be implemented as shown in WO 02/072379 A2. The components of the independent wheel suspension (not shown) are supported relative to the frame 16 by means of actuators 26. The actuators 26 are connected to the hydraulic system 20 by connecting lines 22. The operator of the utility vehicle 10 is, in this case, located in the cab 28 which is arranged on the second part.

The actuators 18, 26 of the suspension system are subjected to a predetermined characteristic. In this case, for example, it may be a spring rate which may be altered in a predetermined manner depending on the spring path and/or the axle load, such as is provided, for example, in the axle suspension system of EP 0 913 280 B1. Depending on the state variable to be controlled, the characteristic may at least partially, preferably over the entire range, have a constant analytical function.

Figure 4:
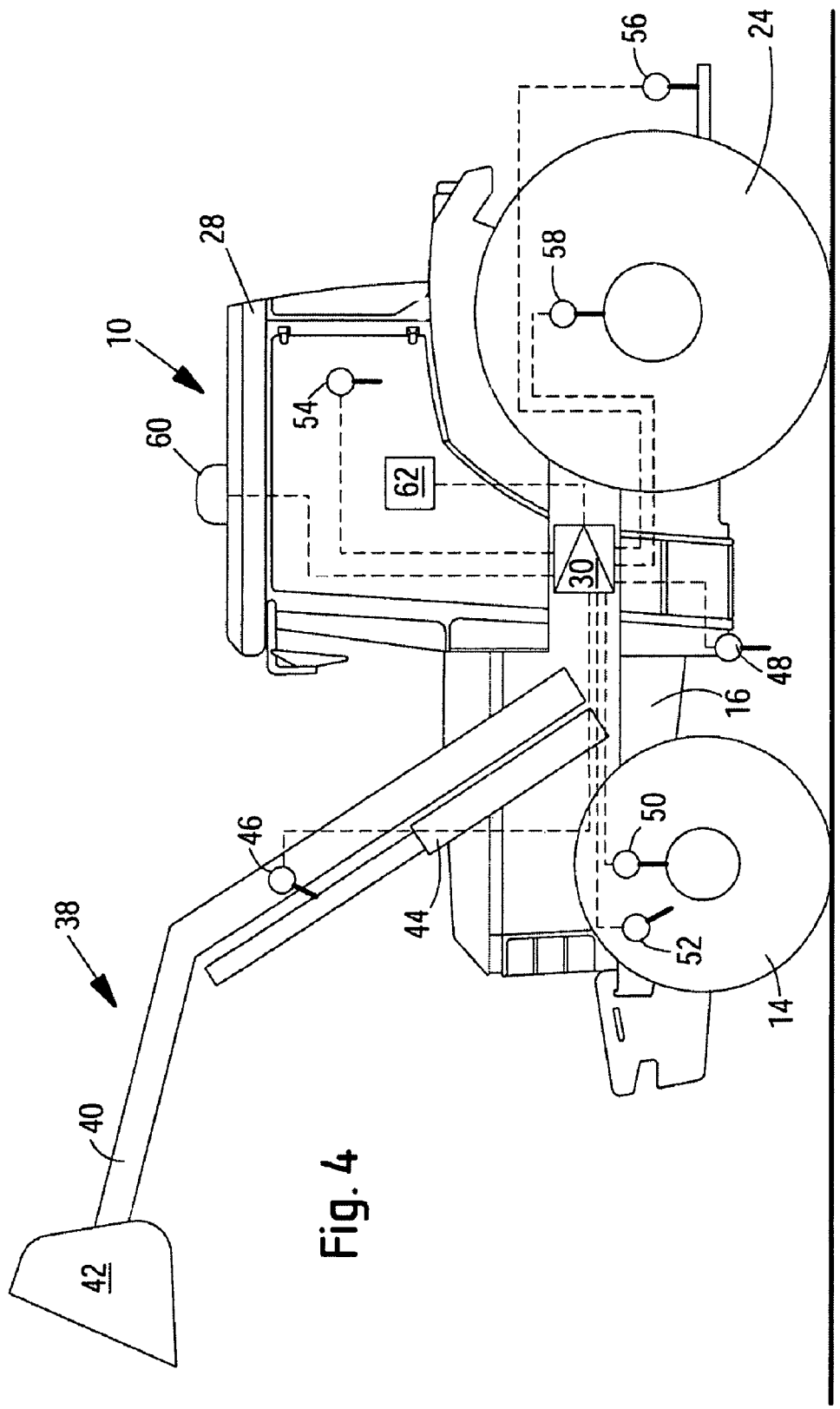
FIG. 4 is a schematic diagram of an agricultural utility vehicle on which a plurality of sensors are arranged.

The utility vehicle 10 includes a plurality of sensors which are shown by way of example in FIG. 4, and accordingly may be provided in the utility vehicle of FIGS. 1 to 3. Moreover, a control unit 30 receives and processes signals generated by the sensors. The active suspension system is controlled by the control unit 30. A sensor detects a variable which represents a state of the utility vehicle 10. By means of the control unit, a current operating state of the utility vehicle 10 may be detected, such as the vehicle speed.

The control unit 30 controls the actuators 18, 26 as a function of the sensed operating state of the utility vehicle 10, and the actuators thereby control movement of the vehicle frame 16 (second part) relative to the rear wheel suspension components (first part), in order to make a non-optimal or an unsafe operating state of the utility vehicle 10 or a non-optimal or an unsafe operating state of at least one operating function noticeable to the operator in the cab 28.

FIG. 2 shows a second embodiment of an active suspension system in which the cab 28 (the second part) is supported relative to the vehicle frame 16 (the first part) by the actuators 32 in a resilient and dampened manner. Also in this case, the suspension and/or damping is active. The hydraulic system 20 includes accumulators and throttles (not shown) dimensioned accordingly for the damping. This embodiment includes four actuators 32, namely two actuators 32 on the left-hand side and two actuators 32 on the right-hand side. An embodiment of the active suspension system with only two actuators 32 might be also conceivable, for example merely one actuator arranged to the rear on the left-hand side and one actuator arranged to the rear on the right-hand side.

FIG. 3 shows a third embodiment of an active suspension system in which the vehicle seat 34 (the second part) is supported relative to the cab 28 (the first part). To this end, two actuators 36 are provided, by means of which the vehicle seat 34 is mounted relative to the cab 28 in a resilient and/or dampened manner.

FIGS. 1 to 3 show respective suspension systems, where a second part is movable relative to a first part. Although not shown, a utility vehicle could include both a cab suspension system according to FIG. 2 and a seat suspension system according to FIG. 3. In this case, the actuators could be controlled to provide operator comfort, and the actuators could be actively controlled to inform an operator of the existence of a non-optimal or an unsafe operating condition. In this case, the systems are mutually dependent which is to be taken into account during the control.

Figure 5A:
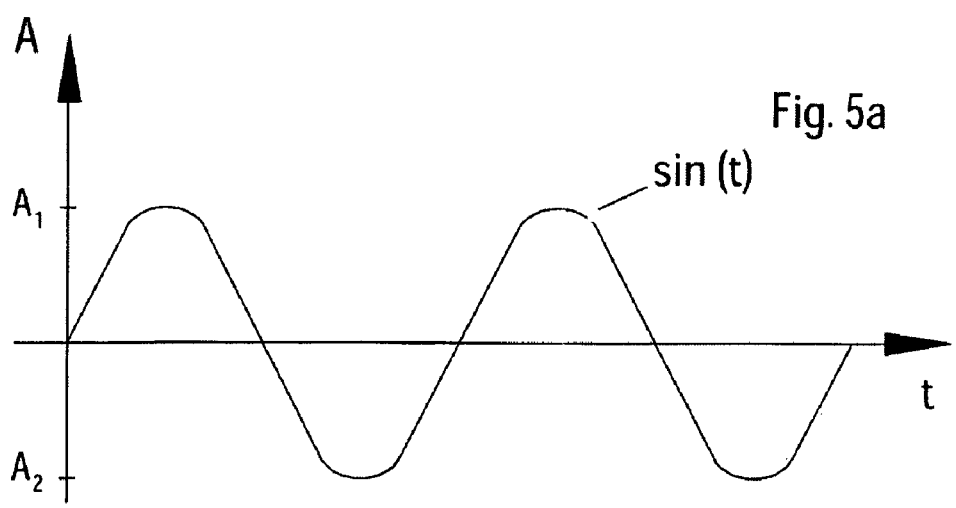
FIGS. 5a to 5c are diagrams of the amplitude of the deflection of an actuator of the active suspension system as a function of time.
Figure 5B:
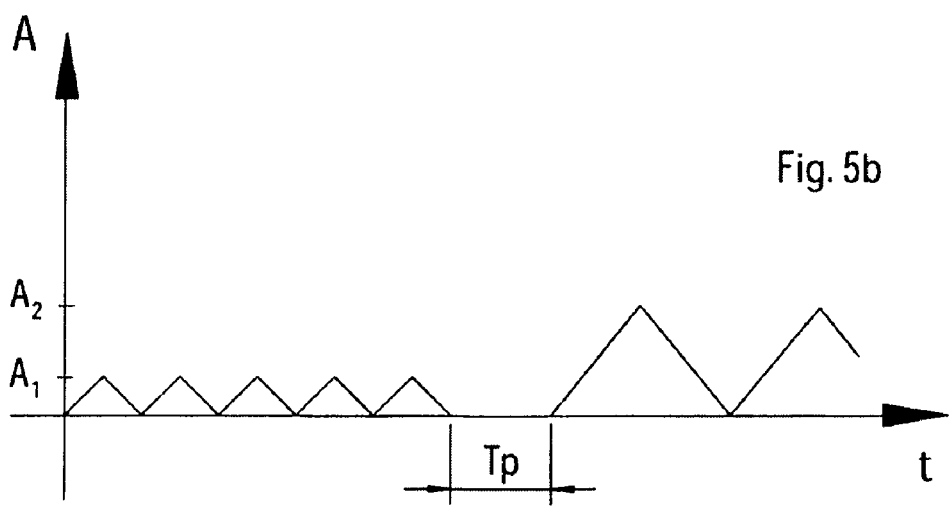
Figure 5C:
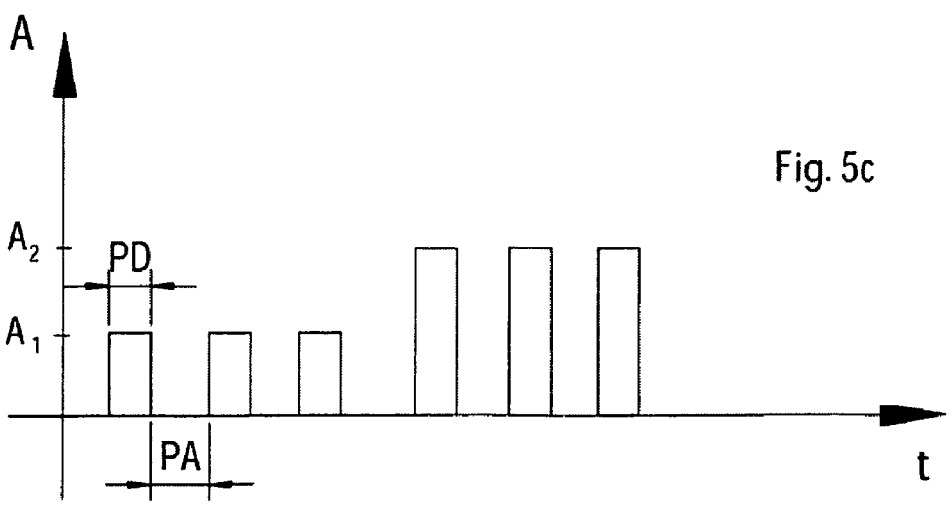

The actuators 18, 26, 32, 36 may be controlled to carry out a predetermined movement, such as a periodic movement, which may be temporally altered. FIGS. 5a-5c show examples of the deflection amplitudes of the actuators 18, 26, 32, 36. Thus, FIG. 5a shows the amplitude A of the deflection of an actuator or a plurality of actuators 18, 26, 32, 36 as a function of the time t. It may also be possible to compare with the deflection of the actuators 18, 26, 32, 36 the temporal path of a control signal controlling an actuator. The deflection shown in FIG. 5a is periodic and has the path of a sine function. The maximum amplitude A1 and A2 is substantially constant, but could be varied. Therefore, the second part vibrates relative to the first part. The vibration has a predetermined frequency which is substantially constant and has a value of 0.2 Hz.

In FIG. 5b a further possible type of movement is shown, wherein the second part moves relative to the first part with a substantially triangular movement, comparable with a saw tooth shape. In this case, initially triangular movements are carried out with an amplitude A1. For a time duration of Tp no actively initiated movement of the actuator follows. In other words, the actuator during this time period is not actively controlled. However, it may carry out movements which may be produced, for example, due to spring movements between the primary and second part. After the time duration Tp has passed, triangular movements are carried out with an amplitude A2. Said movements have a lower frequency than the triangular movements with the amplitude A1.

FIG. 5c shows a pulse type of movement. The pulse interval PA is predetermined. It may be variable and is in a range of 0 to 10 seconds. The pulse duration PD is also predetermined and may be substantially constant. The pulse duration PD has a value of ⅕ seconds.

The movement of the second part relative to the first part has, according to FIGS. 5a to 5c, an amplitude with a predetermined value which is in a range of 1 mm to 30 mm. In this case, it is taken into account that the movement produced by the actuator and/or actuators is limited such that it does not harm the vehicle or the operator.

The actuators 18, 26, 32, 36 of FIGS. 1 to 3 are hydraulically drivable, electrically controlled hydraulic valves and throttle elements (not shown). Thus, the flow of pressurized hydraulic fluid to and from the actuators 18, 26, 32, 36 is controlled by corresponding electrical and/or electromagnetically controllable hydraulic valves.

FIG. 4 shows an agricultural utility vehicle 10 which has the active suspension system of FIG. 1 (not shown in FIG. 4). A front loader 38, which comprises a boom 40 and a loading bucket 42 is adapted to the utility vehicle 10. The boom 40 of the front loader 38 may be raised and/or lowered by the dual-acting hydraulic cylinder 44. The front loader is an operating function of the utility vehicle 10.

A plurality of sensors are arranged on the utility vehicle 10 and/or the front loader 38. Thus the travel of the piston rod of the hydraulic cylinder 44 may be determined by sensor 46. The sensor 48 detects the vehicle speed. The sensor 50 detects the speed of the left front wheel 12. Sensors (not shown) are provided for the other three wheels also. The sensor 52 detects the steering angle of the front wheel 12 and/or the front axle. The sensor 54 detects the vehicle acceleration. A draft force sensor 56 may detect draft force from an implement (not shown). A sensor 58 senses torque transmitted to the rear travel drive. Moreover, a GPS receiver 60 may detect GPS vehicle position signals. The sensors are connected by electrical lines (shown in dotted lines) to the control unit 30. Further sensors (not shown) may be provided for sensing other parameters, from which vehicle or implement conditions can be determined or derived. Thus, in particular, actuator sensors 64 (FIG. 1) are provided for sensing the state of an actuator 18 and/or 26 and transmitting this information to the control unit 30.

In the cab 28 of the utility vehicle 10 (FIG. 3), a display device 62 generates a visual and an acoustic signal representing the movement initiated by the actuators 36.

The present invention may be provided on original equipment vehicles or provided as a retrofit assembly to suspension systems on vehicles which have been manufactured or sold previously.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle active suspension system having an actively controllable actuator for controlling movement of a second vehicle part relative to a first vehicle part upon which the second part is resiliently supported, a sensor for sensing a parameter of the vehicle, and a control unit for controlling the actuator as a function of the sensed parameter, characterized by:
the control unit, in response to the sensed parameter, actively controls the actuator to move the second part relative to the first part in order to make a non-optimal operating condition noticeable to an operator of the vehicle, the actuator moving the second part relative to the first part with a single movement pulse to alert the operator that a specific state of an implement adapted to the utility vehicle is present.

2. The suspension system of claim 1, wherein:
the first part comprises an operator platform or a utility vehicle cab, and the second part comprises an operator seat.

3. The suspension system of claim 1, wherein:
the first part is an independent wheel suspension or a vehicle axle and the second part is a vehicle frame or a vehicle chassis.

4. The suspension system of one of claim 1, wherein:
the first part is a vehicle frame and the second part is an operator platform or a utility vehicle cab.

5. The suspension system of claim 1, wherein:
the movement of the actuator has an amplitude in a range of 1 mm to 20 cm.

6. The suspension system of claim 1, wherein:
the control unit causes a pulsed movement of the actuator.

7. The suspension system of claim 1, further comprising:
an actuator sensor which senses a present state of the actuator and transmits an actuator state signal to the control unit.

8. The suspension system of claim 1, wherein:
the control unit limits movement of the actuator to prevent harm.

9. The suspension system of claim 1, wherein:
the actuator moves the second part relative to the first part when a shaft speed deviates from a predetermined speed.

10. The suspension system of claim 1, wherein:
the actuator moves the second part relative to the first part when vehicle speed deviates from a predetermined speed.

11. The suspension system of claim 1, wherein:
the actuator moves the second part relative to the first part depending on a nature of a surface over which the vehicle travels.

12. The suspension system of claim 1, wherein:
the control unit interrupts movement initiated by the actuator.

13. The suspension system of claim 1, wherein:
the control unit generates a visual and/or acoustic signal when it causes the actuator to move the second part relative to the first part.

14. A method of operating a vehicle suspension system having an actively controllable actuator for controlling movement of a second vehicle part relative to a first vehicle part upon which the second part is resiliently supported, a sensor for sensing a parameter or a condition, and a control unit for controlling the actuator as a function of the sensed parameter, wherein the method comprises:
sensing a parameter or condition; and
in response to the sensed parameter or condition, actively moving the actuator to make the operator aware of the parameter or condition, the actuator moving the second part relative to the first part with a single movement pulse to alert the operator that a specific state of an implement adapted to the utility vehicle is present.

* * * * *